3,297,684
PHOTOCHEMICAL PROCESS FOR THE PREPARATION OF LACTAMS

Yoshikazu Ito, Mizuho-ku, Nagoya, Kunio Shiji, Niwa-gun, Aichi-ken, Saihei Nomura, Mizuho-ku, Nagoya, Ryo Endo, Minami-ku, Nagoya, Akio Ikeyama, Nishikasugai-gun, Aichi-ken, and Fumino Nishikawa, Minami-ku, Nagoya, Japan, assignors to Toyo Rayon Kabushiki Kaisha, Tokyo, Japan, a corporation of Japan
No Drawing. Filed Jan. 21, 1964, Ser. No. 340,855
Claims priority, application Japan, Jan. 24, 1963, 38/3,429
1 Claim. (Cl. 260—239.3)

The present invention relates to a method for removing the sulfurous content of hydrochloric acid by the use of nitrosyl chloride or gas containing the same. More particularly, the present invention relates to a method for removing by the use of nitrosyl chloride or gas bearing the same the minute amounts of sulfurous acid which originates with the sulfuric catalyst and is entrained into the by-product hydrochloric acid which is generated in the Beckmann's rearrangement reaction when lactam is manufactured by subjecting to the Beckmann's rearrangement in the presence of a sulfuric catalyst a cycloalkanone oxime hydrochloride which is obtained by the photochemical reaction of a cycloalkane with a gas mixture of nitrosyl chloride and hydrogen chloride.

The method is known which comprises preparing a reaction product mainly consisting of a cycloalkanone oxime hydrochloride by the photochemical reaction of a cycloalkane with a gas mixture of nitrosyl chloride and hydrogen chloride and subjecting said reaction product to the Beckmann's rearrangement in the presence of a sulfuric catalyst such as concentrated sulfuric acid or oleum to produce the corresponding lactam. The manufacturing process of the aforementioned cycloalkanone oxime hydrochloride by photochemical reaction is referred to as "photosynthesis" in the present specification to simplify the following description. Nitrosyl chloride, a component of the raw material for the photosynthesis, is usually prepared by reacting hydrogen chloride with nitrosyl sulfuric acid. Thus the by-product hydrogen chloride generated in the Beckmann's rearrangement reaction is all recirculated for effective utilization as raw material for the photosynthesis process and the manufacturing process of the above-mentioned nitrosyl chloride. In this case said by-product hydrogen chloride has previously been circulated for reuse after purified by the conventional method which comprises first absorbing said by-product hydrogen chloride into dilute hydrochloric acid to form concentrated hydrochloric acid and then heating said concentrated hydrochloric acid to about 100° C. again to release hydrogen chloride. However, we have discovered that repeated use of the hydrogen chloride purified by the conventional method considerably deteriorates the quality of a cycloakanone oxime hydrochloride obtained by the photosynthesis and the resultant lactam. The main cause has been found ascribable to the existence of minute amounts of sulfurous acid entraining on the by-product hydrochloric acid which is generated in the Beckmann's rearrangement reaction as referred to above. Said sulfurous acid gas is entrained on hydrogen chloride and exists in the concentrated hydrochloric acid obtained by the absorption step in the dissolved form of sulfurous acid ($H_2SO_3$), and again is introduced into the hydrogen chloride as sulfurous gas ($SO_2$) which is released from the generation step, and thus exercises a considerably adverse effect on the quality of lactam produced as above described. Although the sulfurous gas content of the hydrogen chloride is in this case as small as, for example, less than 1%, its complete removal is no easy mattery, because tremendous quantities of hydrogen chloride are recirculated through the series of steps to manufacture the aforementioned lactam.

The previously known methods of removing sulfurous gas coexistent which hydrogen chloride include a method (U.S. Patent No. 2,416,011) which involves the use of sulfuric acid and a method (British Patent No. 470,417) which comprises scrubbing by hydrochloric acid containing calcium sulfate and calcium chloride.

From the industrial point of view, however, the process of the U.S. Patent No. 2,416,011 has these drawbacks: (1) the removal of sulfurous gas is not satisfactory so that there still remain minor amounts of said gas even after scrubbing by sulfuric acid; (2) a scrubbing tower is required for removing the sulfurous gas; (3) the sulfuric acid which has been used in scrubbing should be stripped of sulfurous gas dissolved therein. On the other hand the British Patent No. 470,417 is defective because (1) it involves a forced supply of large amounts of oxygen, which considerably obstructs operation particularly in the presence of a cycloalkane vapor; and (2) it is less effective to remove sulfurous gas. As described above, no industrially satisfactory method has been proposed as to removal of sulfurous gas. Apart from the previously suggested methods, a process may be theoretically considered which comprises oxidation of sulfurous gas by the use of oxidant such as manganese dioxide, permanganate, bichromate or hypochlorite. However, use of these oxidants is disadvantageous and unrecommendable, because a concurrent decomposition of hydrochloric acid is unavoidable regardless of the amount applied, and consequently not only loss of hydrochloric acid but generation of chlorine always result.

As the result of studies, we have accomplished the present invention by discovering that if treated by nitrosyl chloride or gas containing the same, the sulfurous content of hydrochloric acid can be removed quite easily and substantially completely without releasing chlorine at the same time. Further description will be made later to show that the process of the present invention not only has a wide industrial application as an effective and satisfactory means for removal of the sulfurous content of hydrochloric acid, but also is particularly suitable for application as an integral part of the series of steps to manufacture lactam by photosynthesis in that nitrosyl chloride is used as the required agent.

The object of the present invention is to provide a means to remove sulfurous acid from hydrochloric acid. Another object is to offer a method for removing sulfurous gas from the by-product hydrogen chloride generated in the manufacturing process of lactam by the Beckmann's rearrangement reaction of a cycloalkanone oxime hydrochloride with sulfuric acid as catalyst. Another object is to provide a process to purify circulating hydrogen chloride in order to obtain good quality lactam by a series of manufacturing steps including photosynthesis and the Beckmann's rearrangement reaction. The further object is to offer a process which permits the continuous operation of the aforesaid means. Other objects and merits of the present invention will be more clearly understood by the following description.

According to the process of the present invention, hydrogen chloride substantially free from sulfurous gas can be produced by introducing nitrosyl chloride into hydrochloric acid containing sulfurous acid for contact with said acid and then heating said hydrochloric acid. Nitrosyl chloride may be introduced either into the concentrated hydrochloric acid obtained by absorbing impure hydrogen chloride into water or dilute hydrochloric acid or into impure hydrogen chloride prior to concentration by absorption. Nitrosyl chloride should be used in equivalent amounts to sulfurous acid, that is, theoretically at the ratio of 2 mol to 1 mol of the sulfurous acid. Unless, however, the aforesaid absorbing operation of hydrogen chloride is conducted in a closed system which is completely shut off from the air, only 1 mol or less of nitrosyl chloride is sufficient. The reason is that nitrogen oxide generated in the oxidation of sulfurous acid by nitrosyl chloride is oxidized by atmospheric oxygen, and that this oxide again exercises an oxidizing action on sulfurous acid.

In the process of the present invention in which a sulfurous gas-removing operation is incorporated in the series of manufacturing steps of lactam through photosynthesis, the source of nitrosyl chloride may be supplied by taking part of a gas mixture of nitrosyl chloride and hydrogen chloride charged into the reactor as raw material for photosynthesis, or part of the gas containing nitrosyl chloride which is discharged from the photosynthesis reactor as unreacted gas and then immediately recirculated to said reactor, and directly introducing said part into the proper sections of equipment. After directly mixed with the hydrogen chloride containing sulfurous gas which is generated in the Beckmann's rearrangement reactor and drawn out therefrom, the above gases bearing nitrosyl chloride are transferred to the hydrogen chloride absorber. Another process is to conduct a gas mixture of nitrosyl chloride and hydrogen chloride discharged from the photosynthesis reactor as unreacted gas into a separate second absorber of hydrogen chloride (if the aforementioned absorber is designated as the first unit) instead of directly introducing said mixture into the sulfurous gas-containing hydrogen chloride to form concentrated hydrochloric acid solution containing nitrosyl chloride and then mix said solution with the impure concentrated hydrochloric acid containing sulfurous acid which is concentrated in the first absorber and discharged therefrom. After all, any method will do, so long as it can bring nitrosyl chloride into close contact with hydrochloric acid containing sulfurous acid. To establish good contact, the mixture should preferably be in a well-stirred condition.

The absorbent liquid of hydrogen chloride includes water or dilute hydrochloric acid. Said dilute hydrochloric acid may include the residue dilute hydrochloric acid in the succeeding step of generating hydrogen chloride, and so there is no loss of hydrogen chloride. The concentrated hydrochloric acid which has undergone treatment by nitrosyl chloride is then heated to about 100° C. by a conventional method to generate pure hydrogen chloride.

The tempertaure, pressure and other treating conditions involved in the process of the present invention is subject to no particular limitations. The conventional operating conditions may be directly applicable in which concentrated hydrochloric acid is produced by absorption of hydrogen chloride and said concentrated hydrochloric acid is heated again to generate hydrogen chloride.

Treatment by nitrosyl chloride converts sulfurous acid into sulfuric acid in a very short time, or quite in a moment, so that the hydrogen chloride generated by heating no longer contains sulfurous gas. Although nitrosyl chloride reacts with the water of hydrochloric acid to form hydrogen chloride, this material combines with the hydrochloric acid to be treated and presents no difficulties.

As previously referred to, treatment by nitrosyl chloride is not accompanied by growth of chlorine. This is very significant in the making of lactam through photosynthesis. The reason is that the presence of chlorine would have an extremely adverse effect on the photosynthesis reaction.

If, in case photosynthesis is conducted by the process of the present invention, the consumption of nitrosyl chloride rises too high due to treatment of impure hydrogen chloride, such excess is again utilized in the photosynthesis process and poses no problems.

Following is a summary statement of the main advantages of the process of the present invention in which removal of sulfurous gas is conducted as an integral part of the manufacturing process of lactam through photosynthesis.

(a) Operation is simple and harmful sulfurous acid is removed practically completely from tonnage quantities of hydrochloric acid.

(b) Part of the gas mixture of nitrosyl chloride and hydrogen chloride used in the photosynthesis process can be utilized as a treating agent.

(c) No loss of hydrogen chloride results, and no chlorine is generated which is harmful to the photosynthesis reaction.

(d) Even if the supply of nitrosyl chloride as treating agent should be carried to the excess it will cause no difficulties.

(e) Operation may be carried out continuously.

(f) Hence production of good quality lactam is made possible.

The present invention will be more clearly understood by referring to the examples which follow. It should be noted, however, that the present invention is not limited to said examples.

*Example 1*

2,000 cc. of a gas containing 99 vol. percent of hydrogen chloride and 1 vol. percent of sulfurous gas were absorbed into 100 g. of 21% dilute hydrochloric acid of industrial grade. The sulfurous gas content of the dilute hydrochloric acid indicated 0.05%.

On the other hand 40 cc. of a gas consisting of 50 vol. percent of hydrogen chloride and 50 vol. percent of nitrosyl chloride and 2,000 cc. of the aforesaid gas were absorbed at the same time. The absorbent liquid of dilute hydrochloric acid was observed to contain only 0.001% of sulfurous acid.

*Example 2*

A Beckmann's rearrangement reactor having a capacity of 800 l. was continuously charged with a photosynthesis product mainly consisting of cyclohexanonoxym hydrochlorate obtained by photosynthesizing cyclohexane into nitroso by nitrosyl chloride and a catalyst of 100% sulfuric acid at the rate of 500 and 495 kg./hr. by weight respectively. The gas generated when the Beckman's rearrangement was conducted at 110° C. was continuously absorbed by means of a hydrogen chloride absorber into 22.5% hydrochloric acid at 40° C. having a feed rate of 870 kg./hr. to obtain 35.5% hydrochloric acid containing 0.35% of sulfurous acid. Said 35.5% hydrochloric acid was continuously mixed with the 35.5% hydrochloric acid containing 0.25% of sulfurous acid which was obtained by absorbing by means of a separate hydrogen chloride absorber the gas containing nitrosyl chloride which was partly collected from the unreacted gas circulating through the photosynthesis process. The result showed that the hydrochloric acid after mixing contained no sulfurous acid. The hydrochloric acid containing no sulfurous acid and the hydrochloric acid containing sulfurous acid prior to oxidation were heated separately to generate hydrogen chloride. Measurement was made of the amounts of sulfur compounds contained in the photosynthesis product which was obtained by using said hydrogen chloride as raw material for photosynthesis, and the amounts of reductive material contained in the sulfuric acid solution of the lactam which was obtained by subjecting said photosynthesis product to the Beckmann's rearrangement.

Further, said sulfuric acid solution of lactam was neutralized by ammonia until pH stood at 5.0 at 80° C. Then 2.0% of caustic soda was added to the crude lactam which was obtained by dehydrating said neutralized solution at a vacuum of 80 mm. Hg. Measurement was made of the permanganic acid value of the lactam which was obtained by vacuum distillation at 5 mm. Hg abs. and cutting the distillate at 120 to 125° C. The results of these measurements are presented in the following table, showing that sulfurous acid had been removed very effectively.

|  | Where sulfurous acid was not removed | Where sulfurous acid was removed |
|---|---|---|
| Sulfurous acid concentration in hydrochloric acid (percent). | 0.35 | 0.00. |
| Content of sulfur compounds in photosynthesis (percent). | 0.10 | 0.00. |
| Content of reductive material in sulfuric acid solution of the lactam obtained by subjecting photosynthesis product to the Beckmann's rearrangement with 100% sulfuric acid as catalyst.[1] | 3.5 to 4.5 | 1.5 to 2.0. |
| Permanganic acid value of distillate at 5 mm. Hg abs. and 120 to 125° C.[2] | 50 | 300. |

[1] Expressed in values arrived at by converting to oxym the amount of ferric reductive material contained in the crude lactam obtained by the Beckmann's rearrangement. In general, smaller values represent the better quality of lactam.

[2] This is one of the methods whereby the quality of distilled crude lactam or purified lactam is indicated. The number of seconds is taken for indication which is required until the 1/100 N solution of potassium permanganate is completely decolored. In general, larger numbers indicate the higher quality of lactam.

Having described the specification, we claim:

In the manufacturing process of lactam which comprises producing a cycloalkanone oxime hydrochloride by photoreacting a cycloalkane with a gas mixture of nitrosyl chloride and hydrogen chloride and manufacturing the corresponding lactam by the Beckmann's rearrangement reaction of said cycloalkanone oxime hydrochloride in the presence of sulfuric acid catalyst, the improvement comprising a method for removing sulfurous acid from the by-product hydrogen chloride containing sulfurous acid generated in the Beckmann's rearrangement reaction which consists in absorbing the by-product hydrogen chloride generated in said reaction into dilute hydrochloric acid to form concentrated hydrochloric acid before said by-product is recirculated to the aforesaid photosynthesis process, bringing said concentrated hydrochloric acid into contact with a gas mixture of nitrosyl chloride and hydrogen chloride and then heating the same to generate hydrogen chloride.

References Cited by the Examiner

UNITED STATES PATENTS 3,069,233  12/1962  Marullo et al. _____ 23—154
3,090,739  5/1963  Ito _____ 360—239.3

WALTER A. MODANCE, *Primary Examiner.*

R. T. BOND, *Assistant Examiner.*